(12) United States Patent
Schmidt et al.

(10) Patent No.: US 11,554,437 B2
(45) Date of Patent: Jan. 17, 2023

(54) SYSTEM, METHOD AND APPARATUS FOR WELDING TUBES

(71) Applicant: GENERAL ELECTRIC TECHNOLOGY GMBH, Baden (CH)

(72) Inventors: Richard Jeffrey Schmidt, Ooltewah, TN (US); Junior Grant Parrish, Chickamauga, GA (US); Ronald Francis Konopacki, Suffield, CT (US); Russell O'Daniel Brumfield, Cleveland, TN (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 354 days.

(21) Appl. No.: 16/890,048

(22) Filed: Jun. 2, 2020

(65) Prior Publication Data

US 2020/0290144 A1    Sep. 17, 2020

Related U.S. Application Data

(63) Continuation of application No. 15/443,368, filed on Feb. 27, 2017, now Pat. No. 10,702,941.

(51) Int. Cl.
*B23K 9/00* (2006.01)
*B23K 9/10* (2006.01)
(Continued)

(52) U.S. Cl.
CPC .......... *B23K 9/0052* (2013.01); *B23K 9/0282* (2013.01); *B23K 9/095* (2013.01);
(Continued)

(58) Field of Classification Search
CPC .......... B23K 2101/06; B23K 9/0052; B23K 9/0282; B23K 9/095; B23K 9/0956;
(Continued)

(56) References Cited

U.S. PATENT DOCUMENTS

| 2,649,527 A | 8/1953 | Chapman et al. |
| 3,614,077 A | 10/1971 | Blackburn et al. |

(Continued)

FOREIGN PATENT DOCUMENTS

| EP | 1818129 | 8/2007 |
| GB | 1031821 | 6/1966 |

(Continued)

OTHER PUBLICATIONS

JP Office Action issued in corresponding JP Application No. 2019-544014 dated Feb. 8, 2022.

*Primary Examiner* — Dana Ross
*Assistant Examiner* — James F Sims, III
(74) *Attorney, Agent, or Firm* — Grogan, Tuccillo & Vanderleeden, LLP

(57) ABSTRACT

A system for manufacturing boiler tubes includes a first spindle for receiving a first tube having a first weld preparation, a second spindle for receiving a second tube having a second weld preparation, the first spindle and the second spindle being rotatable synchronously, and a welding device having a first weld head. The welding device is configured to automatically weld the first tube to the second tube according to a control routine stored in memory to produce a boiler tube.

20 Claims, 7 Drawing Sheets

(51) Int. Cl.
*B23K 9/028* (2006.01)
*B23K 9/095* (2006.01)
*B23K 9/127* (2006.01)
*B25J 15/00* (2006.01)
*B25J 15/04* (2006.01)
*B23K 101/06* (2006.01)

(52) U.S. Cl.
CPC .............. *B23K 9/0956* (2013.01); *B23K 9/10* (2013.01); *B23K 9/127* (2013.01); *B25J 15/0019* (2013.01); *B25J 15/04* (2013.01); *B23K 2101/06* (2018.08); *G05B 2219/45135* (2013.01)

(58) Field of Classification Search
CPC ........ B23K 9/10; B23K 9/127; B25J 15/0019; B25J 15/04; G05B 2219/45135
See application file for complete search history.

(56) References Cited

U.S. PATENT DOCUMENTS

| | | | |
|---|---|---|---|
| 4,144,992 | A | 3/1979 | Omae et al. |
| 4,851,639 | A * | 7/1989 | Sugitani ................ B23K 9/287 219/125.11 |
| 2004/0249495 | A1 | 12/2004 | Orozco et al. |
| 2005/0103766 | A1* | 5/2005 | Iizuka ................ B23K 9/0216 219/124.34 |
| 2005/0211684 | A1 | 9/2005 | Jaeger et al. |
| 2016/0003751 | A1 | 1/2016 | Reiz |

FOREIGN PATENT DOCUMENTS

| | | |
|---|---|---|
| JP | 53-30947 | 3/1978 |
| JP | 58-89290 | 6/1983 |
| JP | S58-117068 | 2/1985 |
| JP | S61-049774 | 3/1986 |
| JP | S61-130988 | 6/1986 |
| JP | S6341393 | 3/1988 |
| JP | H08243739 | 9/1996 |
| JP | H091330 | 1/1997 |
| JP | H0910938 | 1/1997 |
| JP | H09-164487 | 6/1997 |
| JP | H09155543 | 6/1997 |
| JP | 2000-126894 | 5/2000 |
| JP | 2004-330227 | 11/2004 |
| JP | 2008-212953 | 9/2008 |
| KR | 101143532 | 5/2012 |
| WO | 2016135654 | 9/2016 |

* cited by examiner

SYSTEM, METHOD AND APPARATUS FOR WELDING TUBES

CROSS REFERENCE TO RELATED APPLICATIONS

This application claims the benefit of U.S. application Ser. No. 15/443,368, filed on Feb. 27, 2017, the recitations of all of the foregoing applications being incorporated herein by reference in their entirety.

BACKGROUND

Technical Field

Embodiments of the invention relate generally to systems and methods for manufacturing long tubes and, more particularly, to a system, method and apparatus for welding long boiler tubes.

Discussion of Art

Long tubes for use in boilers are typically manufactured by welding commercially available, shippable tube lengths end to end. These long tubes vary in length depending on production and machine capability requirements. Typically, tube length is limited by the physical limitations of tube bending systems, which are utilized to bend the long tubes into serpentines. In general, existing long tube bending systems can handle tubes in the 25 to 100 meter length range. To meet long tube end requirements, multiples of long tubes are made to the maximum capacity of the bending system in sections and are butt welded together to produce the desired finished product length. In addition to having a variable length, the long tubes, which consist of multiple individual tubes, can have multiples of tube diameters, wall thicknesses and chemical compositions.

All tubing used to manufacture long tubes for use in boilers undergoes the same preparation process prior to bending. These steps are sequential and generally manual in operation, and/or are carried out on dedicated machines that each perform one of a plurality of discrete operations. For example, existing long tube manufacturing processes involve pre-preparation, material checking, cleaning, tube end preparation, straight tube butt welding, non-destructive weld testing, repair, and post-production bending steps, many of which are performed manually or carried out on individual machines requiring manual operators.

In most production facilities, for tube end preparation, tube bundles are either sent to an independent preparation station for machining weld preparations on the ends of the tubes so that they may be welded, or to a smaller line which saws and cuts the tubing into shorter lengths for use as header nipples or loose tubes. These end preparation lines can be manual or semiautomatic standalone systems. During end preparation, the outside diameter of the tube ends are cleaned and then a weld groove preparation machined into the ends of the tubes. After completion of the machining of weld preparations on the tube ends, the tubes are sent to storage racks or rebundled.

In preparation for welding, tube bundles are placed on an unbundling rack where the bundling straps are removed and the tubes, already having a machined weld preparation on the opposing ends, are fed into storage/feed racks. The individual tubes are then loaded onto an infeed conveyor on demand where they are shuttled to a straight tube welding work station. At this station, the tubes are serially welded end to end using manual butt welding, orbital welding and the like. With existing systems, insertion of the tubes, alignment, start/stop and weld parameter control are all performed manually by an operator. After welding, the tubes are inspected for defects and stored prior to bending to shape.

As indicated above, existing welding system and processes require individual, discrete machines and manual operators, and often require the tubes to be stored or inventoried prior to each step, resulting in significant manufacturing time and costs.

In view of the above, there is a need for a system, method and apparatus for welding long tubes for boilers that is more streamlined, cost-effective and less time consuming than existing methods.

BRIEF DESCRIPTION

In an embodiment, a system for manufacturing boiler tubes is provided. The system includes a first spindle for receiving a first tube having a first weld preparation, a second spindle for receiving a second tube having a second weld preparation, the first spindle and the second spindle being rotatable synchronously, and a welding device having a first weld head. The welding device is configured to automatically weld the first tube to the second tube according to a control routine stored in memory to produce a long boiler tube.

In another embodiment, a method of manufacturing boiler tubes is provided. The method includes the steps of aligning an end of a first tube with an end of a second tube to form a weld groove, the end of the first tube and the end of the second tube each having a weld preparation, rotating the first tube and the second tube synchronously, and with a welding device having a first weld head, automatically performing a weld cycle including a plurality of weld passes to weld the first tube to the second tube.

In yet another embodiment, a system for welding tubes is provided. The system includes a first spindle for receiving a first tube having a first weld preparation, a second spindle for receiving a second tube having a second weld preparation, the first spindle and the second spindle being rotatable synchronously, the first spindle being movable axially towards the second spindle to move the first tube into contact with the second tube to form a weld groove, and a welding device having a first weld head. The welding device and the first weld head are controllable according to a weld technique stored in memory. The weld technique is dependent upon at least a material of the first tube and the second tube and an outside diameter of the first tube and the second tube.

DRAWINGS

The present invention will be better understood from reading the following description of non-limiting embodiments, with reference to the attached drawings, wherein below:

DETAILED DESCRIPTION

Figure 1:
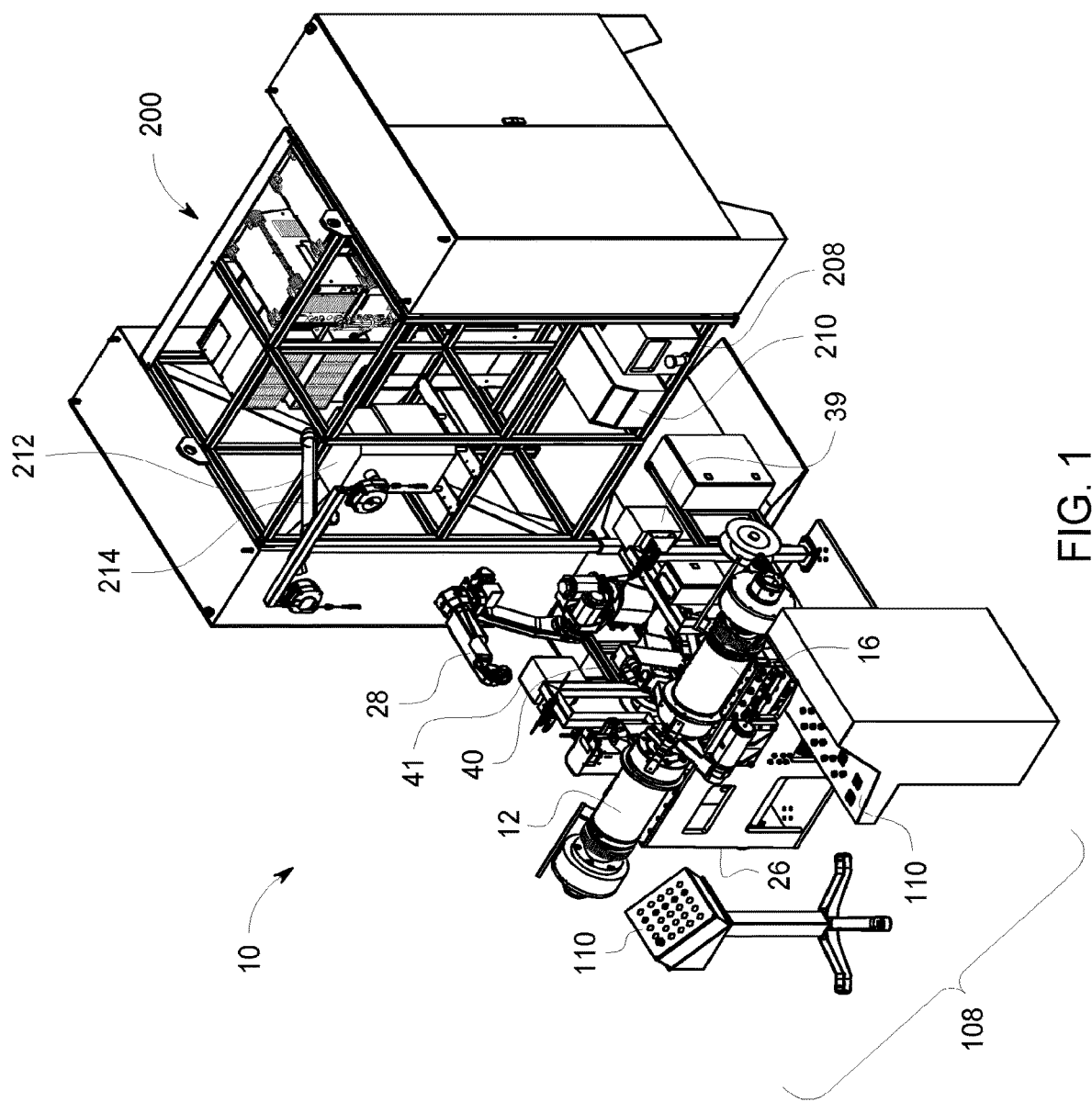
FIG. 1 is a perspective view of an automated system for manufacturing long boiler tubes, according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in connection with the manufacture of long tubes for boilers, including for use in serpentine elements such as superheaters, reheaters, economizers and waterwall membrane panels, embodiments of the invention may also be utilized for creating long lengths of any material or stock, for a variety of end uses. For example, the system and method of the invention is applicable to creating long lengths of tubing or conduit for a variety of applications.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer. As used herein, "autonomously" means without manual or human intervention from the beginning of the welding process to the end of the welding process, and without substantial downtime between successive steps or operations.

Embodiments of the invention relate to a system, method and apparatus for butt-welding tubes end-to-end to create long boiler tubes. The system includes two sets of gripping chucks that each hold a respective tube in an end-to-end arrangement. Each tube has a weld preparation or weld groove machined on each end. The tubes are automatically aligned for welding, which is performed by an autonomous device holding a weld torch that holds a welding electrode in a controlled position that varies as the weld groove is filled with weld metal. The weld torch is interchangeable with other torches stored in holders as part of the in-line welding process, as the process or weld consumable requirement changes.

Figure 2:
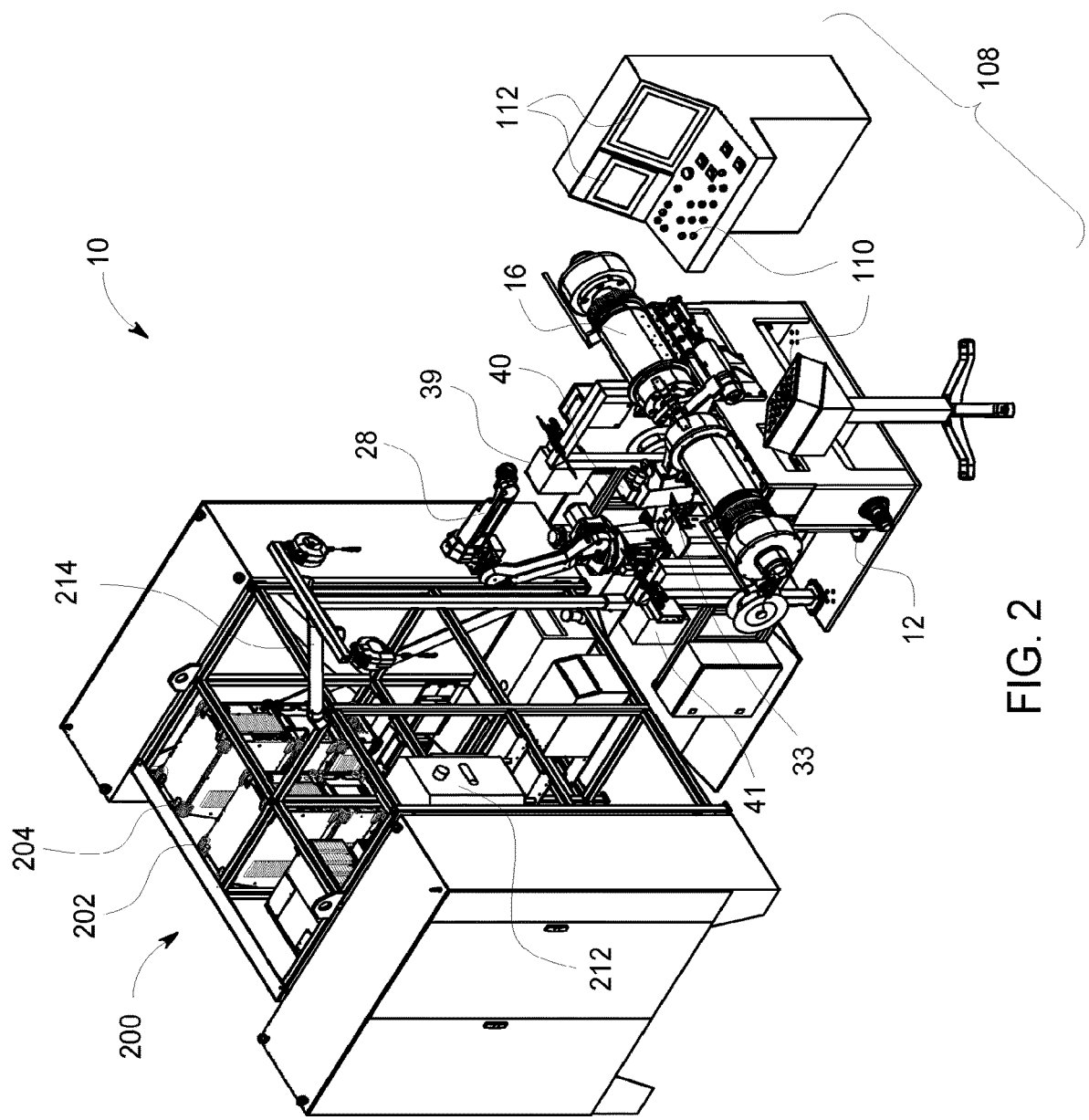
FIG. 2 is another perspective view of the automated system of FIG. 1.
Figure 3:
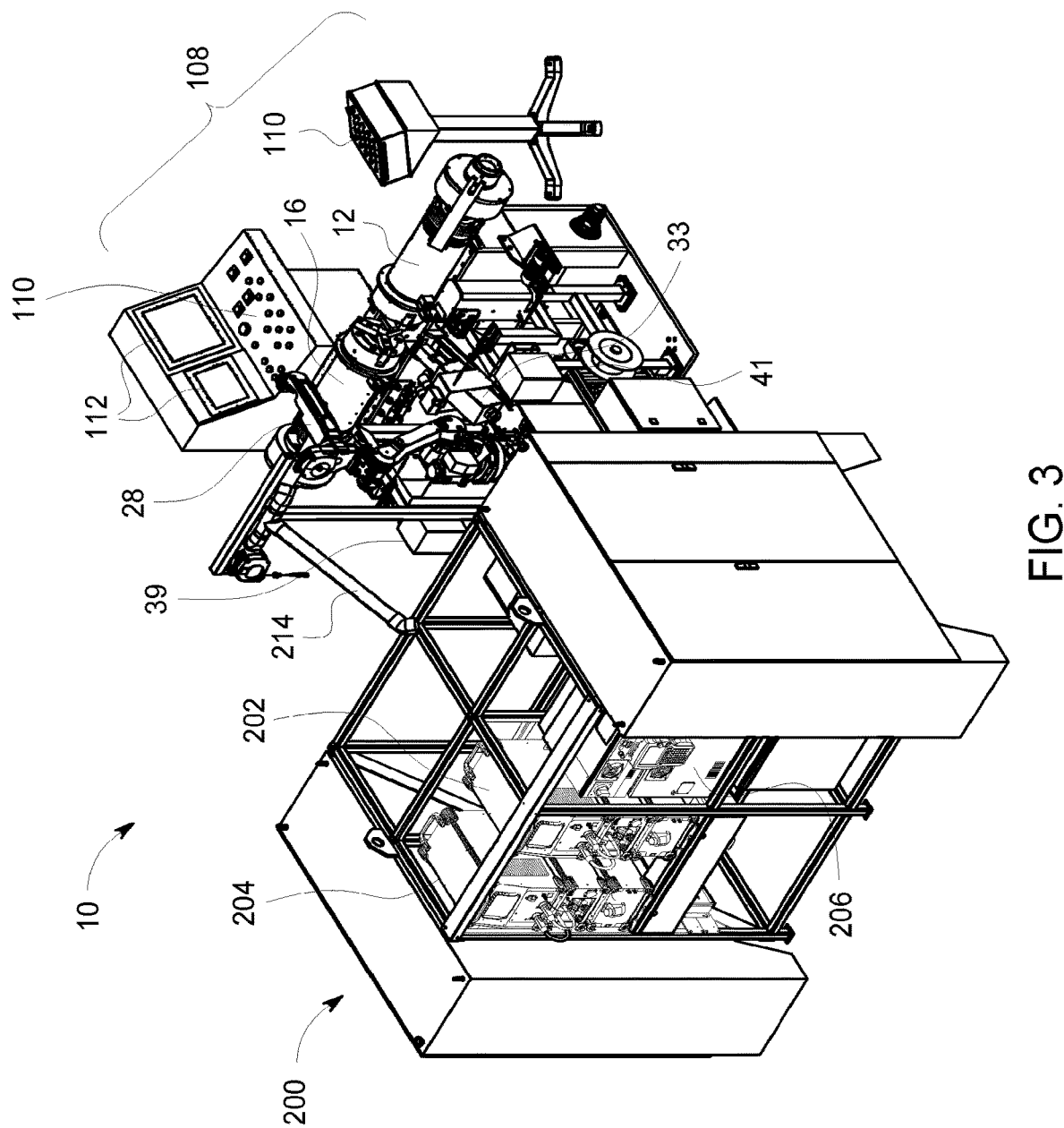
FIG. 3 is a rear, perspective view of the automated system of FIG. 1.
Figure 4:
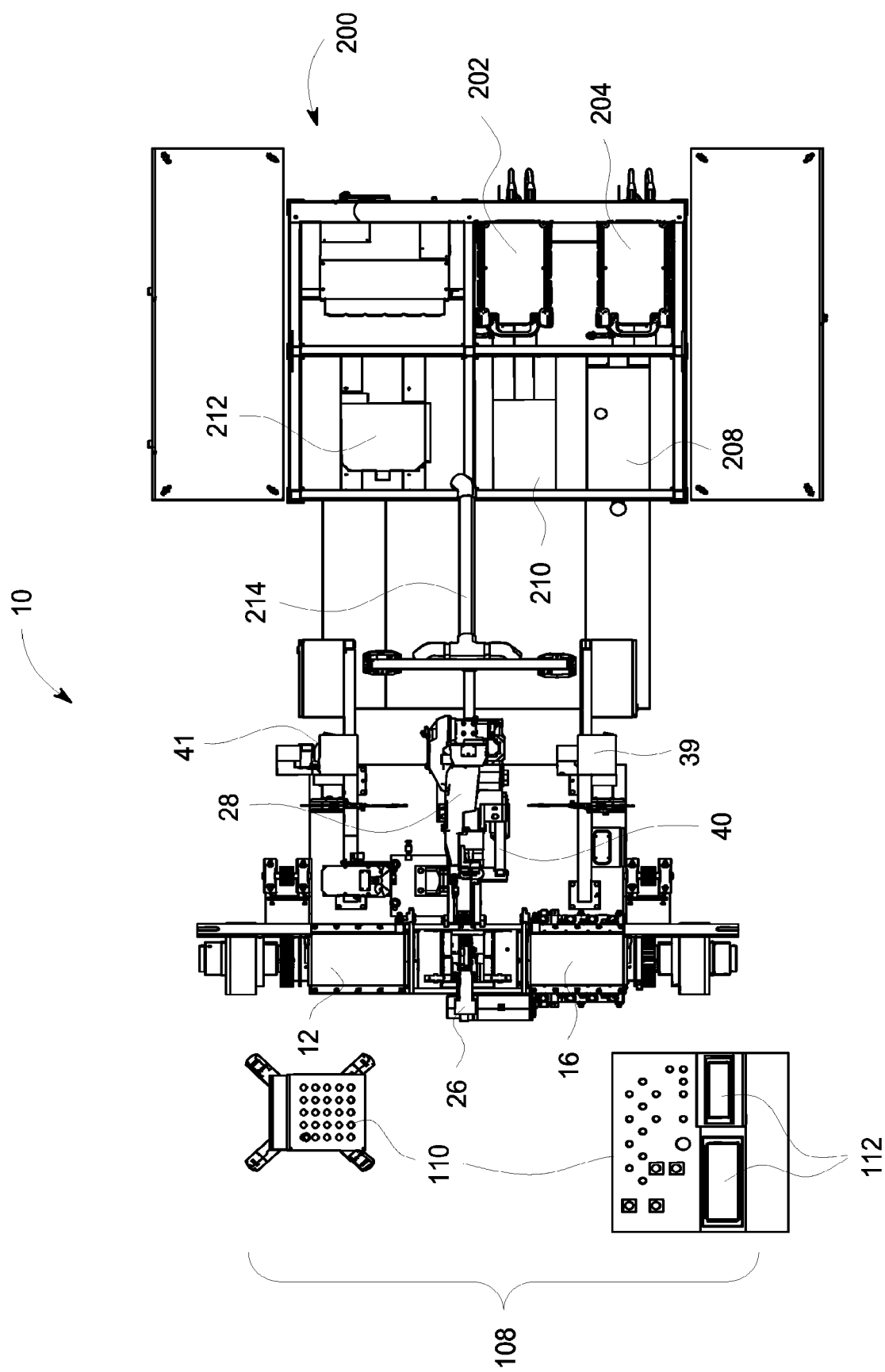
FIG. 4 is a top plan view of the automated system of FIG. 1.
Figure 5:
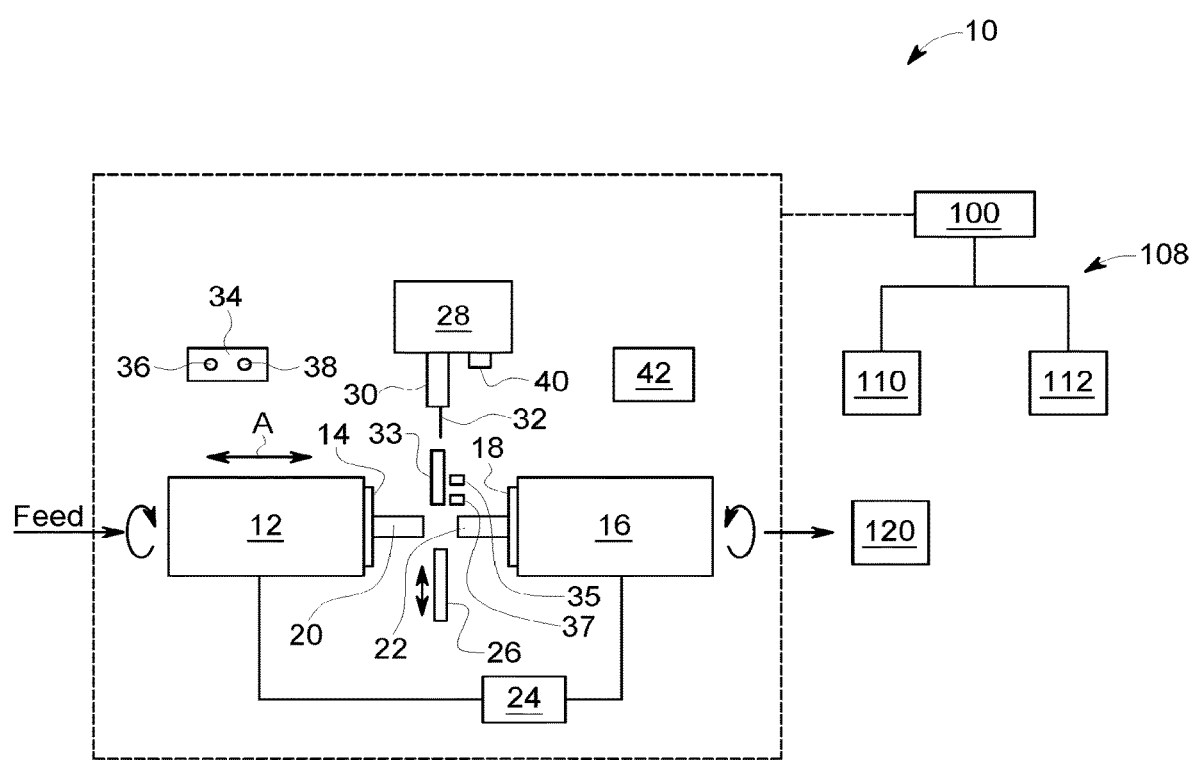
FIG. 5 is a schematic illustration of the automated system of FIG. 1.
Figure 6:
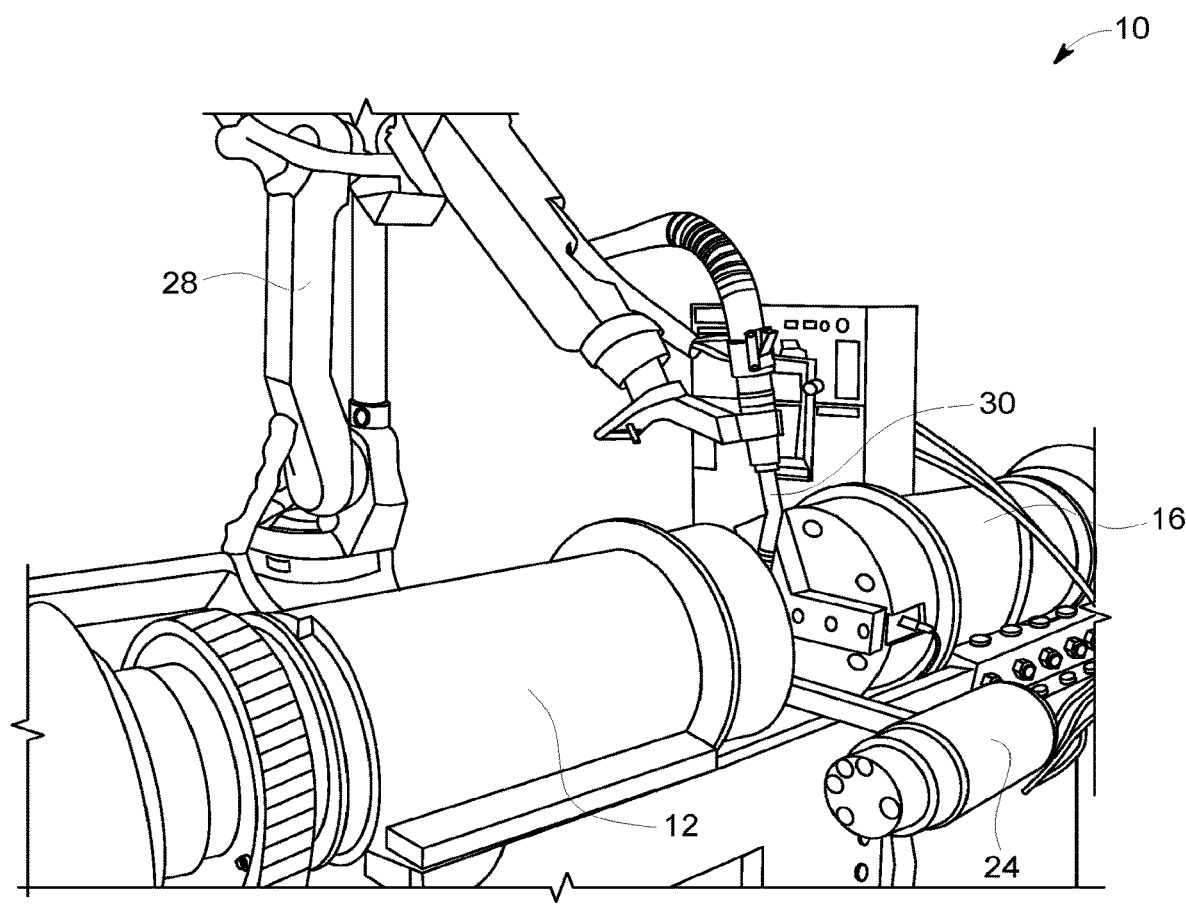
FIG. 6 is an enlarged, perspective view of a portion of the automated system of FIG. 1.
Figure 7:
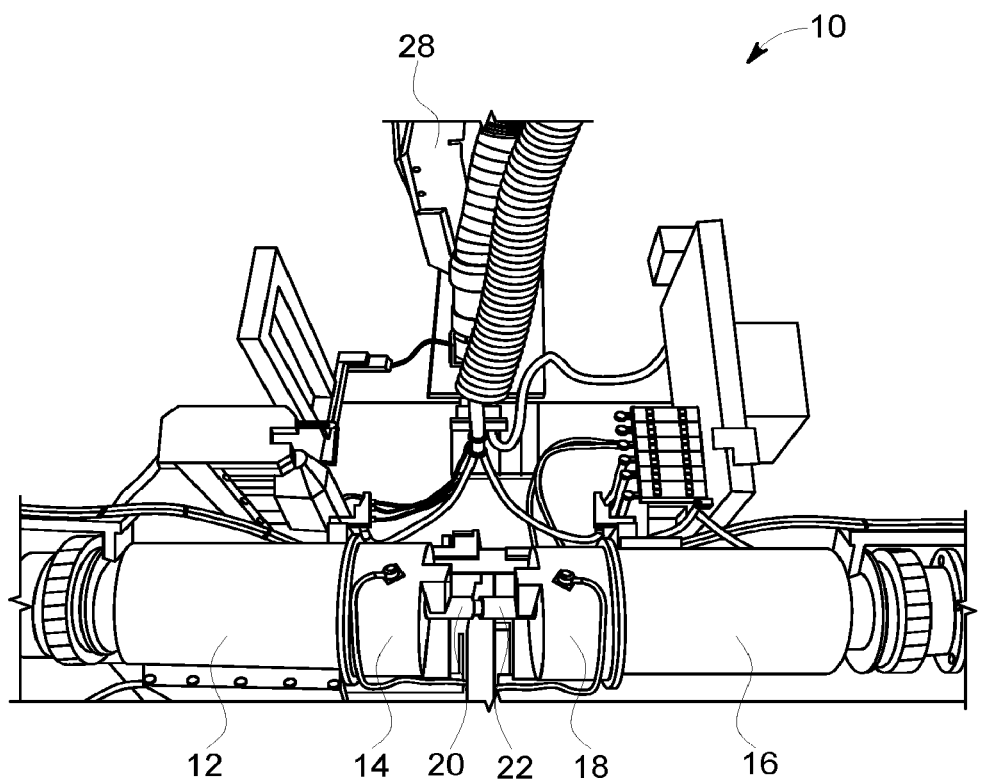
FIG. 7 is enlarged, top plan view of a portion of the automated system of FIG. 1.
Figure 8:
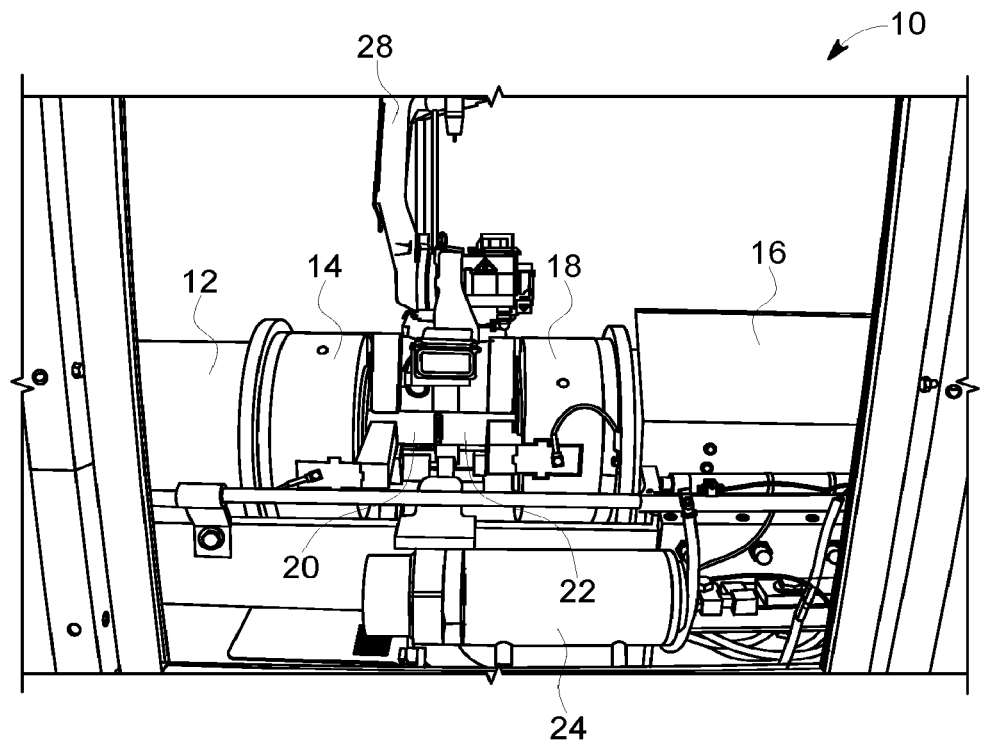
FIG. 8 is an enlarged, front elevational view of a portion of the automated system of FIG. 1.

Referring to FIGS. 1-8, a system 10 in the form of a fully automated and integrated apparatus or station for welding tube stock end-to-end to create long tubes for a boiler is illustrated. The system 10 includes a pair of spindles including a first spindle 12 having a first chuck 14 and a second spindle 16 having a second chuck 18. The spindles 12, 16 each include a throughbore (not shown) within which the chucks 14, 18 are mounted and which permit tube stock to be welded to pass longitudinally therethrough. In this respect, the throughbores of each spindle 12, 16 are aligned longitudinally. In an embodiment, the spindles 12, 16 are each rotatable about a common longitudinal axis. At least one of the spindles, such as first spindle 12 is axially slidable or moveable (e.g., in the direction of arrow A best shown in FIG. 5), while the other spindle 16 is in fixed position. In an embodiment, both spindles 12, 16 may be axially moveable.

In an embodiment, the chucks 16, 18 can be opened and closed to clamp a pair of tubes 20, 22 to be welded therein. For example, the chucks 16, 18 may be operated pneumatically, hydraulically or manually. Likewise, spindle 12 may be pneumatically or hydraulically actuated to effect sliding movement thereof and, in other embodiments, may be manually positioned. As illustrated in FIGS. 1-5, the system 10 includes a motor 24 configured to provide a rotational output to rotate the spindles 12, 16. In an embodiment, the motor 24 is a servo drive connected to one or more pulleys and synchronous belts that rotate the stationary spindle 16 and the sliding spindle 12 through a common shaft. The servo drive is configured to provide precise rotation of the spindles 12, 16 at a rate between approximately 5 second to 20 seconds per weld pass, as discussed in detail hereinafter.

With further reference to FIGS. 1-5 the system 10 also includes a moveable tube stop 26 intermediate the spindles 12, 16 that can be selectively raised and lowered. In an embodiment, the tube stop 26 may be pneumatically actuated, although other actuation mechanisms known in the art may also be utilized without departing from the broader aspects of the invention. As discussed hereinafter, the tube stop 26 can be selectively raised and serves as a locating device for positioning the ends of the tubes 20, 22 relative to one another prior to locking in place using the chucks 14, 18.

The system 10 further includes a robotic welding device having an arm 28 operatively connected to a CNC or other automated control and positioning system for precisely controlling the position of the robotic arm relative to the ends of the tubes 20, 22 held in position in the chucks 14, 18. In an embodiment, the robotic welding arm 28 has six degrees of freedom (including forward/backward, up/down, left/right translation in three perpendicular axes, and rotation about the three axes). The robotic welding arm 28 includes a tool changer configured to receive a welding torch 30 (also referred to herein as a weld head) having a consumable wire electrode 32. In an embodiment, the welding arm 28 may have an on-board or coupled controller 206 for controlling the position of the electrode tip through the positioning system, and for controlling the welding process.

The system 10 may also include a docking station 34 that holds one or more additional torches/weld heads 36, 38, each torch/weld head having a wire spool hub and wire feeder 39, 41. As discussed in detail hereinafter, the system 10 is configured to facilitate the automatic changeout of torches within the inline welding process to allow for welding utilizing a variety of consumable wire types. In an embodiment, the system 10 includes two different interchangeable torches or weld heads, although more than two torches may be utilized to provide an even broader range of operation, without departing from the broader aspects of the invention. In an embodiment, the torches are gas metal arc welding (GMAW) torches.

Referring still further to FIGS. 1-5, the robotic welding arm 28 may include a vision system 40 including, for example, a digital camera that can be utilized to located the bottom dead center of the weld groove, as discussed in detail hereinafter. The system 10 also includes a cleaning station 42 that is configured to clean the torch cup, spray anti-spatter inside the clean cup and jog the wire forward after each successive weld cycle in preparation for the next weld cycle, as also discussed hereinafter.

In an embodiment, the system 10 may also include a heating device 33 that can be selectively deployed to heat the weld area (e.g., the weld preparations on the tube ends) prior to welding, which may be necessary for some weld processes and materials, as discussed in detail below. For example, the heating device 33 may be an induction heater having a coil that can be moved, under control of a control unit, into close proximity (but not in touching contact) to the joint between the tube ends. In an embodiment, the induction heater 33 may be mounted on a slide movable by a linear or like actuator. A distance sensor 35 may be utilized to ensure that an air gap is maintained between the induction heating coil and the wall of the tubes 20, 22. A heat detector 37 can be included to detect the surface temperature of the tube.

The robotic welding arm 28 and its associated positioning system, the cleaning station 42, the position stop 26, the chucks 14, 18, the servo drive 24, the induction heater and its positioning system, the heat detector/sensor 37 and the distance sensor 35 are electrically connected or otherwise in communication with a control unit 100 that controls operation of the various devices and the system 10, as a whole, according to a program or algorithm stored in memory. A human-machine interface (HMI) 108 in communication with the control unit 100 and including a user input device 110 and a display 112 allows for the real-time viewing of the welding process and for displaying process parameters to a user. The display 112 and input device 110 may include a touch screen computer or standard computer with keyboard, a video monitor and various pushbuttons for controlling the various functions of the system 100. In addition, the input device 110 may include a joystick for offsetting the weld torch if the vision system 40 does not position the tip of the wire 32 of the torch 30 in the center of the weld groove. The touch screen computer can be utilized to enter the welding parameters, as discussed hereinafter. In an embodiment, the touch screen computer transfers the input parameters to the control unit 100 (or to the on-board controller of the robotic welding arm 28), and the data is stored in memory.

In an embodiment, a housing 200 located adjacent to the robotic welding device 28 and spindles 12, 16 may house the control unit 100, power supplies 202, 204 for the welding device 28, as well as a cooler 208 and a power supply 210 for the induction heater 33, and associated electronics. As best shown in FIGS. 1-4, the system 10 may also include a fume extractor 212 having a connecting tube 214 extending from the fume extractor 212 to a location above the weld zone for removing and processing gases and fumes generated during the welding process.

In operation, two tubes 20, 22 each having a weld preparation on the ends to be welded are loaded into the spindles 12, 16 from a storage rack utilizing, for example, a conveyor or rollers. The ends are pushed against the raised position stop 26 towards one another and the chuck jaws 14,18 are clamped on the tubes 20, 22. Under control of the control unit 100, the position stop 26 is then lowered and the sliding spindle 12 is moved axially towards the stationary spindle 16 until the ends of the tubes 20, 22 touch, forming a weld groove. The system 10 is now ready to start the weld cycle.

Welding parameters are entered into the system 100 utilizing the HMI 108. For example, all parameters necessary for each pass of a multiple pass weld are entered utilizing the HMI 108. In an embodiment, the parameters include the torch number (or torch ID), pass total, rotation speed (of the spindles), rotation delay, rotation overlap, oscillation frequency, oscillation delay, oscillation width, dwell, vertical offset, horizontal offset, top dead center offset, wire diameter, tube diameter, tube wall thickness, and tube material. The welding parameters may be entered into the system 10 before or after aligning the tubes 20, 22 for welding. In an embodiment, weld control routines or techniques may be pre-stored in a database of the HMI 108 for retrieval by the control unit 100.

Once the welding parameters are entered and the tubes are aligned longitudinally to form the weld groove, the vision system 40 is used to locate the bottom dead center of the weld groove. Before the weld cycle begins, a protective lid on a camera of the vision system 40 is opened and a backlight is moved to the weld groove. The camera transmits an image to the vision system 40 (or the control unit 100) which then compares it to the weld groove profiles stored in memory to determine which profile matches. If a match is found, the offset data is passed to the next move instruction and the robotic welding arm 28 moves the welding torch into position at the center bottom of the groove. The joystick of the input device 110 allows an operator to adjust the location of the welding torch, if necessary. The welding cycle may then be initiated through the HMI 108.

For example, a weld technique stored in a database or memory of the HMI 108 may be manually selected by an operator. Alternatively, the control unit 100 may automatically select a weld technique corresponding to the type of weld preparation or weld groove detected by the vision system 40. In an embodiment, the stored weld techniques correspond to the type of material and size of the tubes to be welded. Where no weld technique for a given tube material and tube size can be found in a database, a user may select a weld technique that most closely matches the tubes to be welded. A user may then enter the material type for each tube, joint configuration, and outside diameter of the tubes.

The selected welding technique is then transmitted to the controller of the robotic welding arm 28 so that the welding process can be carried out. During the welding process, the control unit 100 rotates the spindles 12, 16 and tubes 20, 22 synchronously and controls the robotic welding arm 28 to carry out multiple welding passes without intervention by an operator (with the only operator input or intervention occurring remotely through HMI 108). The system 10 is configured to automatically switch torches (e.g., retrieve a new torch 36, 38 from the docking station 34 when a different consumable wire type is requested by the program or by an operator). As alluded to above, the program utilizes parameters downloaded from the HMI 108 to the control unit 100 (or separate robot control) to control the torch 30 during each pass of the weld. The parameters are adjusted at each pass change. Gas flow to the torch 30 is automatically controlled by mass flow controls in dependence upon argon and carbon dioxide flow rates entered through the HMI 108. The gas flow rates may be adjusted or modified for each weld pass using the HMI 108.

As alluded to above, in some embodiments, the induction heater 33 may be utilized to preheat the weld area prior to welding, which is necessary for some alloy materials. Where preheating of the tube ends and weld groove is necessary, the control unit 100 positions the heating coil of the heater 33 in close association with the tube ends, utilizing feedback from the distance sensor 35 to ensure proper positioning. The heater is activated to heat the weld joint to a predetermined temperature. The heat detector or sensor 37 provides feedback to the control unit 100, indicating when the necessary temperature has been reached. Upon completion of heating, the heater 33 may then be retracted to make room for the welding device 28. As with the welding process, the heating step may be carried out fully autonomously as part of the in-line welding process and without intervention or manual manipulation by a human operator.

In the case of a low alloy material (e.g., 1-¼% Chrome such as T-11, T12) the weld joint is preheated to approximately 120° C. to prevent having a post weld heat treatment on an element assembly, and for 2-¼% Chrome such as T-22, T23 etc., the weld joint may likewise be preheated to approximately 120° C. For high alloy materials such as 9% chrome (such as T-91,T-92,T-93) the weld joint is preheated to approximately 200° C. to prevent cracking. In an embodiment, the distance sensor 37 is utilized to maintain an approximately ⅜ inch air gap between the heating coil and the tube surface.

At the completion of a weld cycle, the control unit 100 (or separate robot controller) executes a control routine to move the torch 30 to the cleaning station 42, where the torch cup is cleaned, anti-spatter is sprayed inside the clean cup and the wire is jogged forward extending it for the last operation which cuts the wire to the desired wire extension. The torch is then returned to the home position to wait for the next weld cycle.

In an embodiment, the system 10 is configured for gas metal arc welding, as discussed above, utilizing various wire types. Multiple passes, for example about one to about eight passes, are possible by varying the weld parameters for each pass. In an embodiment, the system 10 is designed to accept tubes having diameters in the range of about 1 inch to about 3 inches and wall thicknesses ranging from about 0.140 inches to about 0.600 inches. Various joint configurations and end preparations may be accommodated by the system 10.

In an embodiment, once the weld is complete, the long tube may be passed to an X-ray system 120 under control of the control unit 100. In the x-ray system, a camera (not shown) is utilized to properly position the weld for x-ray analysis. An x-ray of the weld is then taken to ensure a good weld joint. If the weld is acceptable, then the tube is offloaded or discharged from the system 10. If the weld is unacceptable, the tube is cut through the weld so that re-welding can be performed.

The system of the invention therefore provides for the substantially autonomous welding of tubes end-to-end to form a long tube. As discussed above, the welding process steps, from loading of the tubes, to tube alignment, to performing each weld pass, to x-ray analysis, to offloading can be performed without substantial intervention or input from an operation. In particular, all of these steps require, at a maximum, remote operator engagement through the HMI 108 and do not require any physical manipulation of the tubes themselves, the spindles and chucks, or the welding torches. Automation of the welding process therefore allows a single operator to remotely operate multiple machines, increasing productivity.

It has been discovered that utilizing the autonomous system 10 of the invention to weld straight tubes end-to-end results in an approximately 50% increase in process output with improved weld quality as compared to existing manual processes. This increased throughput and improved quality decreases welding costs, as a whole.

In an embodiment, a system for manufacturing boiler tubes is provided. The system includes a first spindle for receiving a first tube having a first weld preparation, a second spindle for receiving a second tube having a second weld preparation, the first spindle and the second spindle being rotatable synchronously, and a welding device having a first welding torch. The welding device is configured to automatically weld the first tube to the second tube in dependence upon a plurality of weld and tube parameters received by a control unit of the system. In an embodiment, the system also includes a control unit configured to rotate the first spindle and the second spindle synchronously at a predetermined rate dictated by the control unit. In an embodiment, the system further includes a vision system configured to capture an image of a weld groove defined by the first weld preparation and the second weld preparation, wherein the control unit is configured to determine a weld groove type from the image of the weld groove and to select a weld routine in dependence upon the weld groove type. In an embodiment, the vision system is configured to locate a bottom dead center of the weld groove, and the welding device is configured to automatically move the first welding torch into position at a center, bottom of the weld groove based upon information obtained by the vision system. In an embodiment, at least one of the first spindle and the second spindle is movable axially to bring the first tube and the second tube into touching contact. In an embodiment, the system may also include a position stop intermediate the first spindle and the second spindle. The position stop is movable between a raised position in which the position stop limits axial movement of the first tube and the second tube, and a lowered position in which the first tube and the second tube are movable beyond the position stop. In an embodiment, the first welding torch is removable from the welding device during a weld cycle. In an embodiment, the system may also include a docking station having a plurality of welding torches each having a different consumable wire type, wherein the welding device is configured to automatically remove the first welding torch and retrieve one of the plurality of welding torches from the docking station during the weld cycle. In an embodiment, the system includes a cleaning station configured to automatically clean a torch cup of the first torch, spray anti-spatter inside the clean cup and jog a wire of the first torch forward during the weld cycle prior to removing the first welding torch. In an embodiment, the system includes a user interface having an input device and a display device, wherein the input device allows an operator to select the control routine for carrying out a weld cycle. In an embodiment, the control routine is configurable by an operator using the input device.

In another embodiment, a method of manufacturing boiler tubes is provided. The method includes the steps of aligning an end of a first tube with an end of a second tube to form a weld groove, the end of the first tube and the end of the second tube each having a weld preparation, rotating the first tube and the second tube synchronously, and with a welding device having a first welding torch, automatically performing a weld cycle including a plurality of weld passes to weld the first tube to the second tube. In an embodiment, the method may also include the steps of positioning the first tube in a first spindle, positioning the second tube in a second spindle, raising a position stop intermediate the first spindle and the second spindle, advancing the first tube and the second tube until the end of the first tube and the end of the second tube contact opposing sides of the position stop, clamping the first tube in the first spindle, clamping the second tube in the second spindle, retracting the position stop, and axially moving at least one of the first spindle and the second spindle until the first tube and the second tube contact one another to form the weld groove. In an embodiment, the method also includes the steps of capturing an image of the weld groove, with a control unit, determining a weld groove type from the image of the weld groove, selecting a welding technique in dependence upon the weld groove type, performing the weld cycle according to the selected welding technique. In an embodiment, the method may further include the step of, during the weld cycle, exchanging the first welding torch with a second welding torch without manual intervention by an operator, wherein the first welding torch has a consumable wire electrode that is different from a consumable wire electrode of the second welding torch. In an embodiment, the method may include, prior to performing a subsequent weld cycle, automatically cleaning a torch cup of the first torch, spraying anti-spatter inside the clean cup and jogging a wire of the first torch forward. In an embodiment, the steps are performed autonomously under control of a control unit.

In yet another embodiment, a system for welding tubes is provided. The system includes a first spindle for receiving a first tube having a first weld preparation, a second spindle for receiving a second tube having a second weld preparation, the first spindle and the second spindle being rotatable synchronously, the first spindle being movable axially towards the second spindle to move the first tube into contact with the second tube to form a weld groove, and a welding device having a first welding torch. The welding device and the first welding torch are controllable according to a weld technique stored in memory. The weld technique is dependent upon at least a material of the first tube and the second tube and an outside diameter of the first tube and the second tube. In an embodiment, the weld technique is dependent upon a weld groove type. In an embodiment, the system also includes a second welding torch having a consumable wire electrode that is different from a consumable wire electrode of the first torch. The second welding torch is interchangeable with the first welding torch during the weld cycle without manual intervention by an operator.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing boiler tubes, comprising the steps of:
   aligning an end of a first tube with an end of a second tube to form a weld groove, the end of the first tube and the end of the second tube each having a weld preparation;
   rotating the first tube and the second tube synchronously;
   capturing an image of the weld grove with a vision system;
   with a control unit, determining a weld groove type from the image of the weld groove;
   selecting a welding technique based at least in part on at least one of the weld groove type, a weld parameter and a tube parameter; and
   with a welding device having a first weld head, automatically performing a weld cycle including a plurality of weld passes to weld the first tube to the second tube according to the selected welding technique.

2. The method according to claim 1, further comprising the steps of:
   positioning the first tube in a first spindle;
   positioning the second tube in a second spindle;
   raising a position stop intermediate the first spindle and the second spindle;
   advancing the first tube and the second tube until the end of the first tube and the end of the second tube contact opposing sides of the position stop;
   clamping the first tube in the first spindle;
   clamping the second tube in the second spindle;
   retracting the position stop; and
   axially moving at least one of the first spindle and the second spindle until the first tube and the second tube contact one another to form the weld groove.

3. The method according to claim 2, further comprising the step of:
   rotating the first spindle and the second spindle synchronously at a predetermined rate dictated by the control unit based at least in part on the weld parameter and the tube parameter.

4. The method according to claim 1, wherein the step of selecting a welding technique is further based upon at least one of a type of material of the first tube and the second tube, and an outside diameter of the first tube and the second tube.

5. The method according to claim 1, further comprising the step of:
   during the weld cycle, exchanging the first weld head with a second weld head without manual intervention by an operator;
   wherein the first weld head has a consumable wire electrode that is different from a consumable wire electrode of the second weld head.

6. The method according to claim 1, further comprising the step of:
   prior to performing a subsequent weld cycle, automatically cleaning a torch cup of the first weld head, spraying anti-spatter inside the clean torch cup and jogging a consumable electrode wire of the first weld head forward.

7. The method according to claim 1, wherein:
   the steps are performed autonomously under control of the control unit.

8. The method according to claim 1, further comprising the steps of:
   locating with the vision system a bottom dead center of the weld groove; and
   moving the first weld head into position at the bottom dead center of the weld groove based upon information obtained by the vision system.

9. The method according to claim 1, further comprising the step of:
   preheating the first and second tubes to a predetermined temperature prior to welding;
   wherein the control unit is configured to position a heating device in close proximity to the first tube and the second tube, activate the heating device until the predetermined temperature is reached, and retract the heating device upon completion of preheating the first and second tubes.

10. The method according to claim 1, further comprising the step of:

selecting, by an operator employing a user interface having an input device and a display device, a weld routine for carrying out a weld cycle.

11. A method of manufacturing boiler tubes, comprising the steps of:

aligning an end of a first tube with an end of a second tube to form a weld groove, the end of the first tube and the end of the second tube each having a weld preparation;

capturing an image of the weld grove with a vision system;

with a control unit, determining a weld groove type from the image of the weld groove;

selecting a welding technique based at least in part on at least one of the weld groove type, a weld parameter, and a tube parameter; and with a welding device having a first weld head, automatically performing a weld cycle including a plurality of weld passes to weld the first tube to the second tube according to the selected welding technique.

12. The method according to claim 11, further comprising the step of:

moving the first weld head at a predetermined rate dictated by the control unit based at least in part on at least one of the weld groove type, the weld parameter, and the tube parameter.

13. The method according to claim 12, further comprising the step of:

maintaining the first tube and the second tube stationary during the weld cycle.

14. The method according to claim 11, wherein the step of selecting a welding technique is further based upon at least one of a type of material of the first tube and the second tube, and an outside diameter of the first tube and the second tube.

15. The method according to claim 11, further comprising the step of:

during the weld cycle, exchanging the first weld head with a second weld head without manual intervention by an operator;

wherein the first weld head has a consumable wire electrode that is different from a consumable wire electrode of the second weld head.

16. The method according to claim 11, further comprising the step of:

prior to performing a subsequent weld cycle, automatically cleaning a torch cup of the first weld head, spraying anti-spatter inside the clean torch cup and jogging a consumable electrode wire of the first weld head forward.

17. The method according to claim 11, wherein:

the steps are performed autonomously under control of the control unit.

18. The method according to claim 11, further comprising the steps of:

locating with the vision system a bottom dead center of the weld groove; and moving the first weld head into position at the bottom dead center of the weld groove based upon information obtained by the vision system.

19. The method according to claim 11, further comprising the step of:

preheating the first and second tubes to a predetermined temperature prior to welding;

wherein the control unit is configured to position a heating device in close proximity to the first tube and the second tube, activate the heating device until the predetermined temperature is reached, and retract the heating device upon completion of preheating the first and second tubes.

20. The method according to claim 11, further comprising the step of:

selecting, by an operator employing a user interface having an input device and a display device, a weld routine for carrying out the weld cycle.

* * * * *